R. L. NOTMAN.
SHIFTING SEAT.
APPLICATION FILED JAN. 13, 1910.
1,003,148.
Patented Sept. 12, 1911.
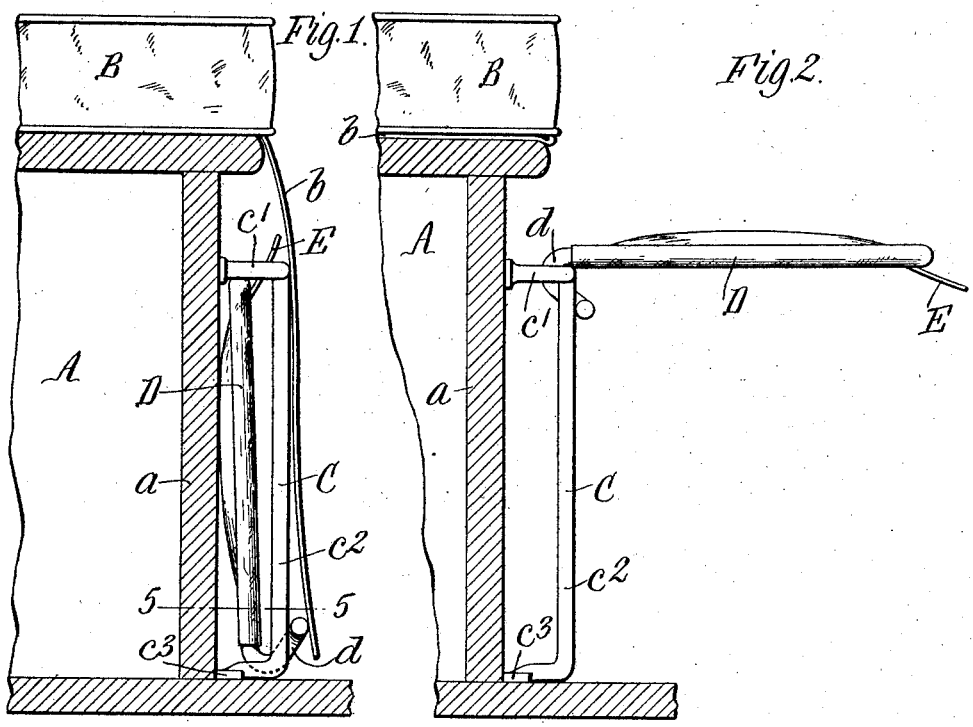
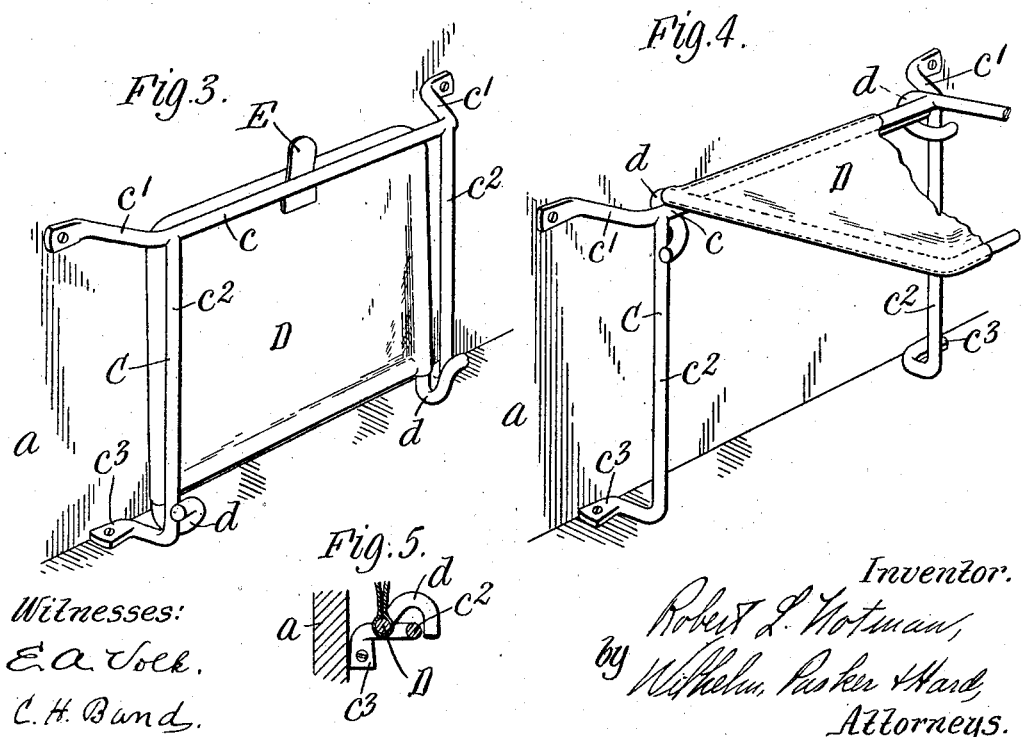

UNITED STATES PATENT OFFICE.

ROBERT L. NOTMAN, OF BUFFALO, NEW YORK, ASSIGNOR TO McKINNON DASH COMPANY, OF BUFFALO, NEW YORK.

SHIFTING SEAT.

1,003,148.      Specification of Letters Patent.      Patented Sept. 12, 1911.

Application filed January 13, 1910. Serial No. 537,852.

*To all whom it may concern:*

Be it known that I, ROBERT L. NOTMAN, a citizen of the United States, residing at Buffalo, in the county of Erie and State of New York, have invented a new and useful Improvement in Shifting Seats, of which the following is a specification.

This invention relates to shifting or folding seats which are adapted to be moved from a position in which they are out of the way when not in use into position for use.

The seat is more particularly intended as an auxiliary or child's seat for vehicles, but is not necessarily restricted to such use.

The object of this invention is to provide a strong and desirable shifting or folding seat which is of simple and inexpensive construction and is provided with rigid or fixed parts which movably engage a supporting frame and are adapted to retain the seat in a horizontal or operative position and to guide the seat into its folded or inoperative position and to retain it in that position when not in use.

In the accompanying drawings: Figure 1 is a side elevation of a shifting or auxiliary seat embodying the invention, showing the seat in its inoperative position. Fig. 2 is a similar view of the seat in position for use. Fig. 3 is a perspective view showing the seat in its inoperative position. Fig. 4 is a perspective view showing the seat in position for use. Fig. 5 is a sectional plan in line 5—5, Fig. 1.

Like reference characters refer to like parts in the several figures.

In the particular application of the device shown in the drawings, A represents the ordinary seat in an automobile or other vehicle which has a vertical front member or supporting board $a$ and is furnished with a cushion B, having the usual apron $b$, which depends from the front edge of the cushion and is adapted to cover the shifting seat when it is out of use, as shown in Fig. 1. When the shifting seat is in use, the apron may be folded under the cushion, as shown in Fig. 2.

C represents a supporting frame, and D a shifting or auxiliary seat which is movably connected thereto. This frame C is rigidly secured to the front board $a$ of the vehicle seat, or may be stationarily secured in position in any suitable manner, and is preferably made of round metal rods or heavy wires and, in the construction shown, comprises a horizontal top bar or member $c$, the ends $c'$ of which are bent rearwardly and are secured to the front board $a$ of the vehicle seat by means of screws or bolts passing through holes in their ends, and two upright guide and support rods $c^2$ which are joined at their upper ends to the top bar near the bends thereof and are secured at their lower ends preferably to the floor of the vehicle by screws or bolts passing through holes in rearwardly bent feet $c^3$ on the guide rods. The seat D is adapted to enter into the space between the front board $a$ and the middle portion of the top bar.

The seat preferably consists of a rectangular frame made of metal rods similar to those used for the supporting frame, and canvas, leather or other suitable material is secured to this rectangular frame to form a cushion. The two side rods of the seat frame are arranged such a distance apart that the seat can pass between the bent end portions $c'$ of the top rod of the supporting frame but will not pass between the two upright guide rods $c^2$. The rear ends of the side rods of the seat frame extend rearwardly beyond the rear rod thereof and are bent to form rigid extensions or hooks $d$ which coöperate with the upright and top rods of the supporting frame for guiding the seat when moved into and out of its operative position and for supporting the seat in its operative position. When the seat is in its horizontal operative position the hooks or extensions pass downwardly in rear of the top rod $c$ of the supporting frame, then forwardly below the top rod and inside of the upright guide rods $c^2$, and then around in front of the guide rods $c^2$ against the front sides of which the ends of the hooks or extensions bear, as shown in Figs. 2 and 4. The hooks or extensions alone, engaging the supporting frame as described, suffice to hold the seat in its operative position and no other supports or braces are needed. When the seat is to be moved to its inoperative position its front portion is first raised until the seat is substantially vertical and the seat is then lowered into the opening between the front board $a$ and the top rod $c$ of the supporting frame. During this downward movement of the seat the hooks or extensions slide on the guide rods $c^2$ and guide the seat into its proper lowered position, shown in Figs. 1 and 3, and then serve to hold it in that position.

E represents a strap or handle secured to the front portion of the seat for facilitating the operation of the seat.

By the combination of the supporting frame and the rigid guide and supporting hooks or extensions of the seat frame, a strong and compact construction is obtained which consists of the minimum number of parts, is cheap to manufacture, easy to operate, and obviates the necessity of using braces or additional supporting means.

The device is easily attached to any vehicle and is inconspicuous when not in use.

The device has been described as especially applicable to vehicle seats, but it may equally well be attached to a wall, counter or other support, or it may be used as a shiftable or collapsible seat or support for various purposes.

I claim as my invention:

1. The combination of a stationary supporting frame, consisting of a horizontal rod and upright side rods and a seat having rigid bent extensions which embrace and slidably engage with said upright side rods for guiding the seat in the movement thereof to and from the operative position and which are adapted to embrace and rest upon said horizontal rod and to bear against said upright side rods to hold the seat rigidly in operative position, substantially as set forth.

2. The combination of a stationary supporting frame consisting of a horizontal rod provided with bent ends adapted to be secured to a support, and upright side rods which are connected at their upper ends to said horizontal rod and are provided with lower ends adapted to be secured to a support and a seat having rigid bent extensions which embrace and slidably engage with said upright side rods for guiding the seat in the movement thereof to and from the operative position and which are adapted to embrace and rest upon said horizontal rod and to bear against said upright side rods to hold the seat rigidly in operative position, substantially as set forth.

3. The combination of a stationary supporting frame consisting of a horizontal rod and upright side rods, and a movable seat adapted to rest on said horizontal rod having rigid bent extensions which extend downwardly in rear of and forwardly beneath said horizontal frame rod, and the ends of which extend in front of and are adapted to bear against said upright frame rods, whereby said extensions serve to rigidly support the seat in the operative position and to guide the same vertically to and from the operative position, substantially as set forth.

Witness my hand, this 10th day of January, 1910.

ROBERT L. NOTMAN.

Witnesses:
C. W. PARKER,
C. B. HORNBECK.

Copies of this patent may be obtained for five cents each, by addressing the "Commissioner of Patents, Washington, D. C."